(12) United States Patent
Loerch

(10) Patent No.: US 6,736,564 B2
(45) Date of Patent: May 18, 2004

(54) PROFILED WAY CLAMPING MECHANISM

(75) Inventor: Richard J. Loerch, Hales Corners, WI (US)

(73) Assignee: Giddings & Lewis Machine Tools, Fond du Lac, WI (US)

( * ) Notice: Subject to any disclaimer, the term of this patent is extended or adjusted under 35 U.S.C. 154(b) by 0 days.

(21) Appl. No.: 10/235,874

(22) Filed: Sep. 5, 2002

(65) Prior Publication Data

US 2004/0047683 A1 Mar. 11, 2004

(51) Int. Cl.[7] .............................................. F16C 17/00
(52) U.S. Cl. ......................... 403/35; 403/373; 403/381
(58) Field of Search ...................... 403/31, 381, 34–39, 403/373, 374.1–374.3; 384/8, 9; 188/67; 269/82

(56) References Cited

U.S. PATENT DOCUMENTS

| | | | |
|---|---|---|---|
| 930,870 A | 8/1909 | Lewis | |
| 3,529,859 A | * 9/1970 | Garczynski | 403/83 |
| 3,876,046 A | * 4/1975 | Lerner et al. | 191/29 R |
| 4,419,924 A | * 12/1983 | Peter et al. | 92/27 |
| 4,425,050 A | 1/1984 | Durand | 403/15 |
| 4,616,948 A | 10/1986 | Jelfs | 403/5 |
| 5,205,204 A | * 4/1993 | Gottling et al. | 92/28 |
| 5,815,892 A | 10/1998 | Geppert | 24/20 |
| 6,050,396 A | 4/2000 | Moore | 198/836.3 |
| 6,053,654 A | 4/2000 | Ledingham | 403/306 |
| 6,227,336 B1 | * 5/2001 | Rudy | 188/43 |
| 6,250,841 B1 | 6/2001 | Ledingham | 403/306 |
| 6,287,045 B1 | 9/2001 | Ledingham et al. | 403/306 |
| 6,383,315 B1 | 5/2002 | Kreipe et al. | 148/526 |
| 6,578,677 B2 | * 6/2003 | Hsu et al. | 188/43 |

OTHER PUBLICATIONS

Brochure from Zimmer GmbH, "Clamping Elements for Schneeberger Linear Technology. Linear Guides", 1999.

* cited by examiner

*Primary Examiner*—James R. Brittain
(74) *Attorney, Agent, or Firm*—Foley & Lardner LLP

(57) ABSTRACT

A clamping mechanism comprises a first clamp half 20 and a second clamp half 22. The first clamp half 20 and the second clamp half 22 contact a linear guide rail 14 at one end thereof and a key 12 at another end thereof, with the key 12 being coupled to the moving member. A plurality of threaded shafts 40 pass through both the first clamp half 20 and the second clamp half 22 while also passing between the linear guide rail 14 and the key 12. A plurality of cooperating nuts 42, 44 are provided on each end of the threaded shafts 40 to secure the first clamp half 20, the second clamp half 22, the linear guide rail 14 and the key 12. When the user desires to alter the position of the moving member relative to the guide rail 14, the user actuates a plurality of pistons 24 located within the clamping mechanism. The actuation of the pistons 24 cause the threaded shafts 40 to "stretch" which allows the first clamp half 20 and the second clamp half 22 to separate from the linear guide rail 14 a sufficient distance to allow the user to alter the position of the moving member.

20 Claims, 3 Drawing Sheets

PROFILED WAY CLAMPING MECHANISM

FIELD OF THE INVENTION

The present invention is directed to clamping mechanisms for guide rails.

BACKGROUND OF THE INVENTION

Profiled linear guide rails have been widely used in mechanical systems for a number of years. One of the important areas of concern for the design of these guide rails is the method of clamping the moving member to the guide rail. It is important that the moving member be clamped to the guide rail in such a manner to provide a high degree of accuracy while restraining the moving member as much as possible during operation.

A number of different types of clamping mechanisms have been developed over the years for clamping a moving member to the guide rail, but all of these mechanisms have their drawbacks. For example, several clamping mechanisms are designed in such a way that some of the forces generated by the clamping mechanism are externalized, resulting in potentially serious distortions in position. This can result in the moving member being slightly misaligned relative to the guide rail. This can be a serious issue when very high tolerances are required. Additionally, many clamping mechanisms that are currently produced require a large number of different parts to be coupled together in a complex arrangement. This adds to the overall complexity and cost of the product.

For these reasons, it would be desirable to develop a new clamping mechanism for a profiled guide rail that incorporates a simple and inexpensive design while also minimizing potential distortions in the clamping mechanism.

SUMMARY OF THE INVENTION

A clamping mechanism in accordance with the principles of the present invention incorporates a simple and inexpensive design while also minimizing potential distortions in the clamping mechanism. A clamping mechanism in accordance with the principles of the present invention provides a first clamp half and a second clamp half. Both the first clamp half and the second clamp half contact a linear guide rail at one end thereof and a key at another end thereof, with the key being coupled to the moving member. A plurality of threaded shafts pass through both the first clamp half and the second clamp half while also passing between the linear guide rail and the key. A plurality of cooperating nuts are provided on each end of the threaded shafts to secure the first clamp half, the second clamp half, the linear guide rail and the key. When the user desires to alter the position of the moving member relative to the guide rail, the user actuates a plurality of pistons located within the clamping mechanism. The actuation of the pistons causes the threaded members to "stretch", causing the first clamp half and the second clamp half to separate from the linear guide rail a sufficient distance to allow the user to alter the position of the moving member. The advantages of this design include the internalization of all the forces associated with the clamping mechanism along with a reduction in the number of components that are required for proper operation.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Figure 1:
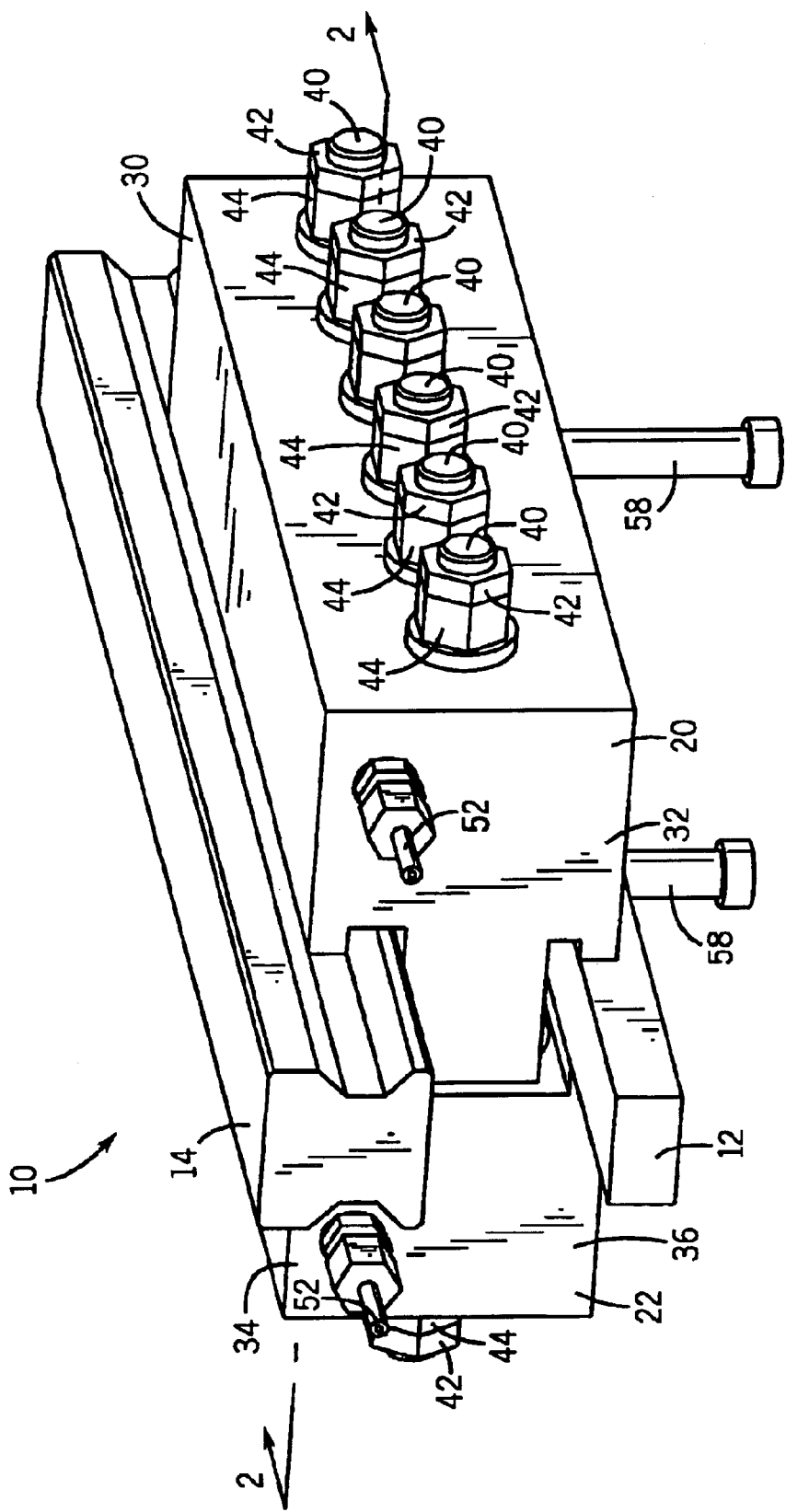
FIG. 1 is affront perspective view of a clamping mechanism in accordance with the principles of the present invention.
Figure 2:
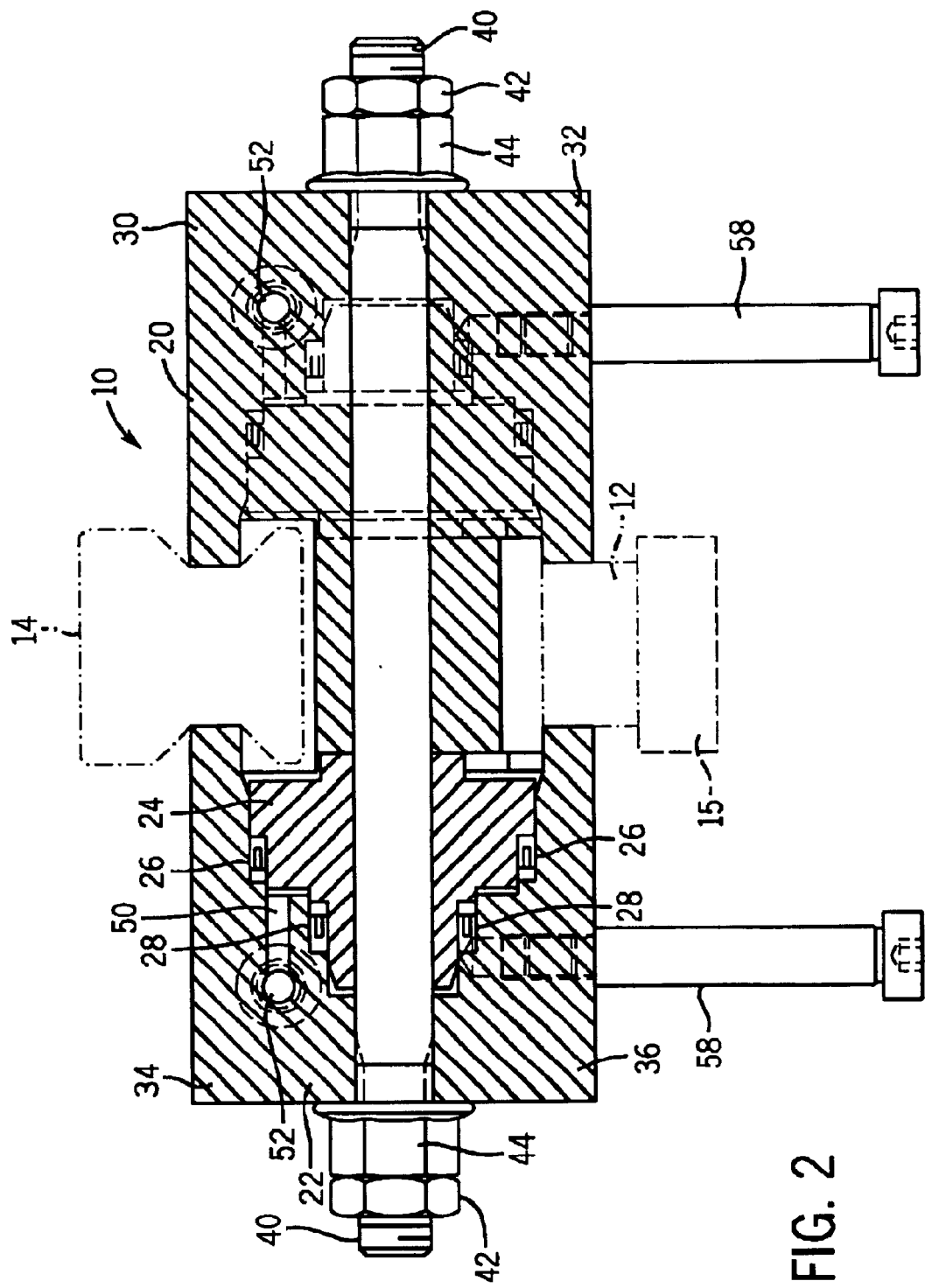
FIG. 2 is a sectional view of the clamping mechanism of FIG. 1 taken along line 2—2 of FIG. 1.
Figure 3:
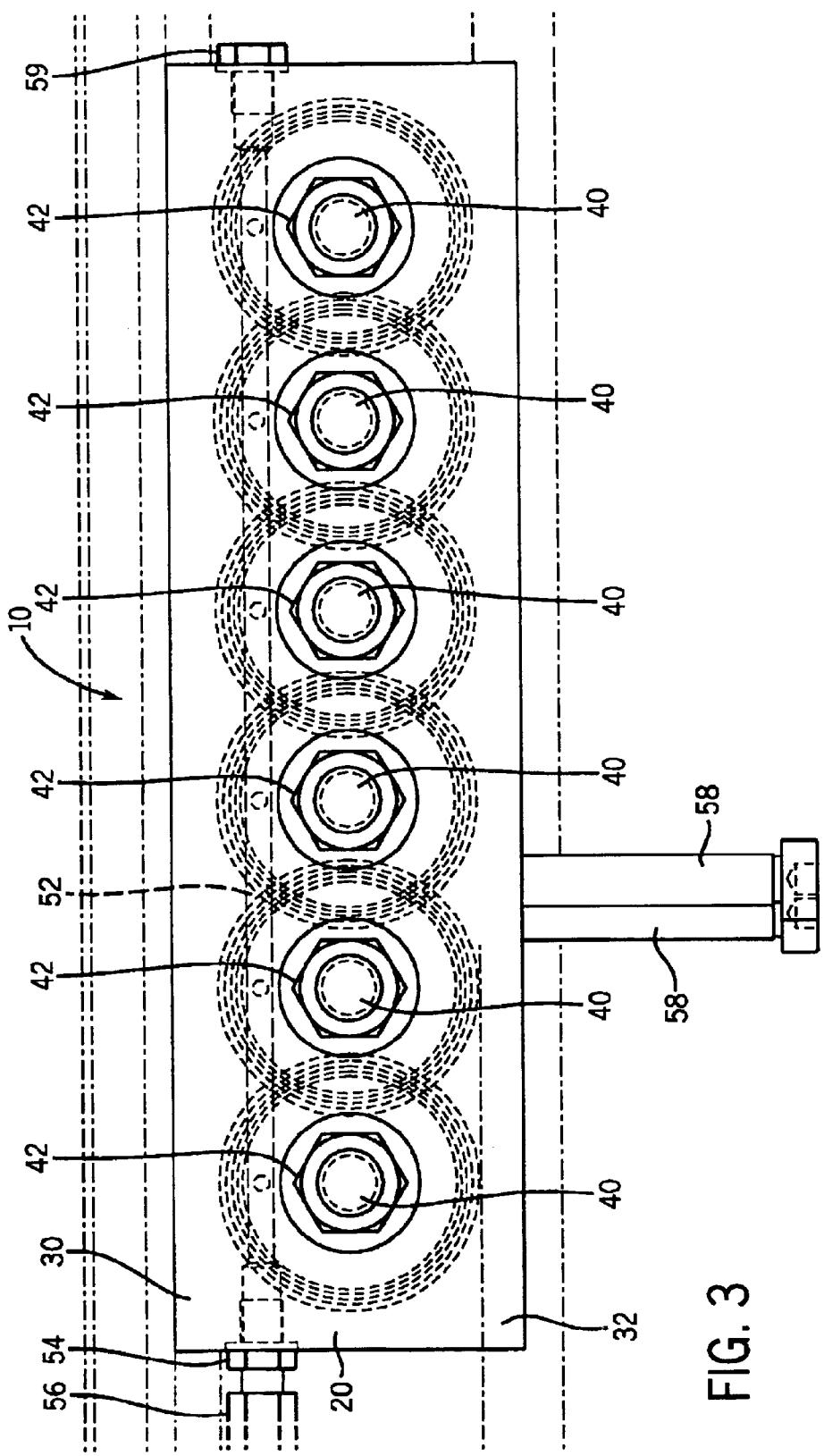
FIG. 3 is a side view of the clamping mechanism of FIG. 1.

A clamping mechanism is generally shown at 10 in FIGS. 1 through 3. The clamping mechanism 10 is used to couple a key 12 to a guide rail 14, with the key 12 coupled to a moving member, represented at 15 in FIG. 2. When used herein, the term guiderail encompasses guideways. In one embodiment of the invention, the guide rail 14 is a linear guide rail, although it may be possible for non-linear guide rails to be used. In a preferred embodiment of the invention, the guide rail 14 is oriented vertically relative to the ground, although it is possible for the guide rail 14 and the key 12 and the clamping mechanism 10, to be oriented in a different manner.

The clamping mechanism 10 comprises a first clamp plate 20 and a second clamp plate 22. The first clamp plate 20 comprises a first clamp plate upper portion 30 and a first clamp plate lower portion 32. Similarly, the second clamp plate 22 comprises a second clamp plate upper portion 34 and a second clamp plate lower portion 36. The first clamp plate upper portion 30 and the second clamp plate upper portion 34 are positioned to each contact substantially opposite sides of the guide rail 14. Similarly, the first clamp plate lower portion 32 and the second clamp plate lower portion 36 are positioned to contact substantially opposite sides of the key 12. The key 12 is fastened to the moving member such that the key 12 can be aligned with the guide rail 14. This arrangement of the first clamp plate 20 and the second clamp plate 22 results in an internalization of the forces in the clamping mechanism 10. With all the forces of the first clamp plate 20 and the second clamp plate 22 contacting the guide rail 14 and the key 12 in the same general vicinity, this internalization of forces helps to prevent warping or torsional effects within the clamping mechanism 10, improving the tolerance and accuracy of the clamping mechanism 10.

The clamping mechanism 10 includes a plurality of threaded shafts 40 that pass through both the first clamp plate 20 and the second clamp plate 22 between the key 12 and the guide rail 14. In one embodiment of the invention, each threaded shaft 40 is secured by an outer hexagon nut 42 and an inner hexagon nut 44 on each side thereof. Each threaded shaft 40 is designed and positioned to provide sufficient clamping force to affix and stabilize the position of the key 12 relative to the guide rail 14. The number of threaded shafts 40 that are used in the clamping mechanism 10 depends primarily upon the required load bearing capacity of the clamping mechanism 10. In one embodiment of the invention, for example, a total of six threaded shafts 40 are used, as shown in FIGS. 1 and 3. In one embodiment of the invention, the threaded shafts 40 are formed from high tensile steel and preferably include a relatively high failure life.

A piston 24 is positioned concentric with each threaded shaft 40 in order to clamp and unclamp the key 12 relative to the guide rail 14. In one embodiment of the invention, the position of each piston 24 alternates relative to the guide rail 14 and the key 12 for each threaded shaft 40. For example, one piston 24 may be on the same side of the guide rail 14 and the key 12 as the first clamp plate 20, with the next piston 24 being on the same side of the guide rail 14 and the key 12 as the second clamp plate 22. This arrangement helps to more evenly distribute the forces in the clamping mechanism 10, while also permitting the threaded shafts 40 to be positioned closer to each other than would otherwise be possible. In one embodiment of the invention, a plurality of shoulder screws 58 are coupled to the first clamp plate 20 or the second clamp plate 22.

For each piston 24, an upper seal 26 and a lower seal 28 are formed between the piston 24 and either the first clamp plate 20 or the second clamp plate 22 (depending upon the position of the pistons 24). For each piston 24, a passageway 50 is formed between the piston 24 and a hydraulic line 52, with one hydraulic line 52 passing through the first clamp plate 20 and another hydraulic line 52 passing through the second clamp plate 22. Each hydraulic line 52 includes a hydraulic fitting 54 at one end of either the first clamp plate 20 or the second clamp plate 22, with the hydraulic fitting 54 being coupled to the hydraulic tubing 56. The opposite ends of both the first clamp plate 20 and the second clamp plate 22 includes a plug 59 for sealing each hydraulic line 52. Each hydraulic line 52 is coupled to a hydraulic source (not shown) for increasing or decreasing the pressure inside the hydraulic lines 52.

The operation of the clamping mechanism 10 is generally as follows. When the clamping mechanism 10 is in a fully clamped position, a tight fit is formed between the first clamp plate 20 and the second clamp plate 22, with the first clamp plate upper portion 30 and the second clamp plate upper portion 34 both contacting the guide rail 14, and the first clamp plate lower portion 32 and the second clamp plate lower portion 36 contacting the key 12. When the position of the clamping mechanism 10 relative to the guide rail 14 is to be altered, the user actuates the hydraulic source coupled to the hydraulic lines 52. The actuation of the hydraulic lines 52 results in the pistons 24 acting against the first clamp plate 20 and/or the second clamp plate 22 away from the guide rail 14. The result of this force is a partial deformation of the individual threaded shafts 40, with the threaded shafts 40 "stretching". This stretching action results in an unclamping of the first clamp plate 20 and the second clamp plate 22 relative to the guide rail 14, permitting the clamping mechanism 10 to move relative to the guide rail 14. According to one embodiment of the invention, only a small degree of unclamping is required for the clamping mechanism 10 to "free itself" from the guide rail 14. For example, in one embodiment of the invention, a deformation of only ⅟1000 of an inch is required to permit movement of the clamping mechanism 10 relative to the guide rail 14.

When the clamping mechanism 10 has been moved to a desired position, the hydraulic source is de-actuated. This de-actuation reduces the pressure of the pistons 24 relative to the first clamp plate 20 and the second clamp plate 22. This relaxation results in the threaded shafts 40 "contracting" to original positions, causing the first clamp plate 20 and the second clamp plate 22 to recontact the guide rail 14. In one embodiment of the invention, the clamping and unclamping action occurs with about 8,000 psi of pressure.

The clamping mechanism 10 of the present invention provides for an improvement in the amount of axial force that is applied to the clamping mechanism 10. For example, in the embodiment of the invention shown in FIGS. 1–3, up to 45,000 pounds of axial force can be applied to the guide rail 14, compared to the 8,000 pounds of clamping force, which is typical for many conventional clamping mechanisms. Furthermore, the clamping mechanism 10 of the present invention also greatly reduces the number of parts that are required for the clamping mechanism 10 to function properly resulting in a simpler and less expensive design.

It should be understood that the above description of the invention and specific examples and embodiments, while indicating the preferred embodiments of the present invention are given by demonstration and not limitation. Many changes and modifications within the scope of the present invention may therefore be made without departing from the spirit thereof and the present invention includes all such changes and modifications.

What is claimed is:

1. A coupling for securing the position of a guiderail relative to a key, comprising:
    a first clamping plate including a region for contacting a portion of the guide rail;
    a second clamping plate for including a region for contacting a portion of the key, the key positioned between a portion of the first clamping plate and a portion of the second clamping plate;
    a plurality of fasteners coupling the first clamping plate and the second clamping plate; and
    a plurality of pistons positioned between the first clamping plate and the second clamping plate,
    wherein actuation of the plurality of pistons causes an extension in the plurality of fasteners, the extension of the plurality of fasteners separating the first clamping plate from the second clamping plate.

2. The coupling of claim 1, wherein the plurality of pistons are operatively connected to at least one hydraulic line, and wherein the plurality of pistons are hydraulically actuated.

3. The coupling of claim 2, wherein a first hydraulic line passes through the first clamping plate, and wherein a second hydraulic line passes through the second clamping plate.

4. The coupling of claim 2, wherein the plurality of fasteners comprises a plurality of threaded shafts secured by cooperating nuts.

5. The coupling of claim 4, wherein the plurality of threaded shafts comprises six threaded shafts secured by six cooperating nuts.

6. The coupling of claim 4, wherein the plurality of threaded shafts are formed from high tensile steel.

7. The coupling of claim 2, further comprising a plurality of external screws for connecting the coupling to an external object.

8. The coupling of claim 2, wherein the guiderail is a linear guiderail.

9. The coupling of claim 2, wherein the guiderail is oriented vertically relative to the ground.

10. The coupling of claim 1, wherein the key is fastened to a moving member such that the key can be aligned with the guide rail.

11. A coupling for securing the position of a guiderail relative to a key comprising:
    first means for providing sufficient clamping force to affix and stabilize the position of the key relative to the guide rail; and
    second means for clamping and unclamping the position of the key relative to the guide rail;
    wherein actuation of the second means for clamping and unclamping causes the first means to relax a sufficient amount to allow the user to alter the position of the and wherein the first means for providing sufficient clamping force comprises:

a first clamping plate including a region for contacting a portion of the guide rail;

a second clamping plate for including a region for contacting a portion of the key, the key positioned between a portion of the first clamping plate and a portion of the second clamping plate; and a plurality of fasteners coupling the first clamping plate and the second clamping plate.

12. A coupling for securing the position of a guiderail relative to a key, comprising:

first means for providing sufficient clamping force to affix and stabilize the position of the key relative to the guide rail; and second means for clamping and unclamping the position of the key relative to the guide rail;

wherein actuation of the second means for clamping and unclamping causes the first means to relax a sufficient amount to allow the user to alter the position of the key, and wherein the second means for clamping and unclamping comprises a plurality of pistons.

13. The coupling of claim 12 wherein the plurality of pistons are operatively connected to at least one hydraulic line, and wherein the plurality of pistons are hydraulically actuated.

14. The coupling of claim 11, wherein the plurality of fasteners comprises a plurality of threaded shafts secured by cooperating nuts.

15. The coupling of claim 14, wherein the plurality of threaded shafts comprises six threaded shafts secured by six cooperating nuts.

16. The coupling of claim 14, wherein the plurality of threaded shafts are formed from high tensile steel.

17. The coupling of claim 11, further comprising a plurality of external screws for connecting the coupling to an external object.

18. The coupling of claim 11, wherein the guiderail is a linear guiderail.

19. The coupling of claim 11, wherein the guiderail is oriented vertically relative to the ground.

20. A coupling for securing the position of a guiderail relative to a key, comprising:

first means for providing sufficient clamping force to affix and stabilize the position of the key relative to the guide rail; and second means for clamping and unclamping the position of the key relative to the guide rail;

wherein actuation of the second means for clamping and unclamping causes the first means to relax a sufficient amount to allow the user to alter the position of the key, and wherein the key is fastened to a moving member such that the key can be aligned with the guide rail.

* * * * *